United States Patent [19]

Smith, III

[11] Patent Number: 4,841,826

[45] Date of Patent: Jun. 27, 1989

[54] SHAPING APPARATUS AND METHOD

[75] Inventor: John Smith, III, Cherry Hill, N.J.

[73] Assignee: Precision Automation Co., Inc., Cherry Hill, N.J.

[21] Appl. No.: 155,865

[22] Filed: Feb. 16, 1988

[51] Int. Cl.$^4$ ........................ B23D 17/06; B23D 23/02

[52] U.S. Cl. ........................................ 83/862; 83/16; 83/49; 83/51; 83/171; 83/597; 83/662; 83/869; 409/293; 409/303; 409/308

[58] Field of Search ................ 409/289, 293, 297–300, 409/303, 308–310, 319; 83/861, 862, 869, 13, 15, 16, 39, 48, 49, 51, 52, 171, 214, 604, 597, 662, 914

[56] References Cited

U.S. PATENT DOCUMENTS

| | | | |
|---|---|---|---|
| 2,590,042 | 3/1952 | Root | 409/289 |
| 3,803,982 | 4/1974 | Lauderdale | 409/315 |
| 4,179,959 | 12/1979 | Lingl, Jr. | 83/49 X |
| 4,404,882 | 9/1983 | Mock | 83/869 |

*Primary Examiner*—Frank T. Yost
*Assistant Examiner*—Hien H. Phan
*Attorney, Agent, or Firm*—Charles F. Duffield

[57] ABSTRACT

A method and apparatus for shaping a solid body of soft material wherein the body is notched on one side, a rough cutter moves inwardly through the other side of the body to enter the closed end of the notch and sever body material without breaking, and a finish cutter than removes relatively little material to produce a finish cut.

15 Claims, 5 Drawing Sheets

SHAPING APPARATUS AND METHOD

BACKGROUND OF THE INVENTION

This invention is concerned with the shaping of a solid body, say the formation of a surface on the body having compound curves, such as a toroidal surface.

More particularly the invention is concerned with forming a rounded surface on a solid body of relatively soft material, say to suitably curve the working end of a bar of deodorant.

Heretofore it was extremely unreliable, at best, to form the end of a deodorant bar, or the like, by shaping cutters, as the bar material was prone to break and thereby damage the goods.

That is, the deodorant bar material was liquefied, as by heat, and poured into containers, in which process the bar end hardened generally flat and unsatisfactory for sale and use. It was impossible to shape and curve the bar end by cutting without breaking the bar material or taking an excessive number of relatively small cuts, which was time consuming and expensive.

Applicant is aware of the below listed prior art for shaping a workpiece:

| U.S. Pat. No. | Patentee |
|---|---|
| 2,590,042 | Root |
| 3,803,982 | Lauderdale |
| 4,404,882 | Mock |

This prior art is subject to the above discussed difficulties.

SUMMARY OF THE INVENTION

It is among the objects of the present invention to provide a method and apparatus for shaping a solid body of soft material which is extremely simple, entirely reliable in operation, and rapid for use in a mass production line.

It is a more particular object of the present invention to provide a shaping method and apparatus of the type described wherein a body is cut on one side to form a notch, and then cut inwardly through the other side to meet the notch, so as to prevent breaking of the bar material before the end of the cut.

It is still another object of the present invention to provide a method and apparatus for shaping a deodorant stick which enables cutting elements to be heated for facilitating the cutting procedure.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

DESCRIPTION OF THE PREFERRED EMBODIMENTS

Figure 1:
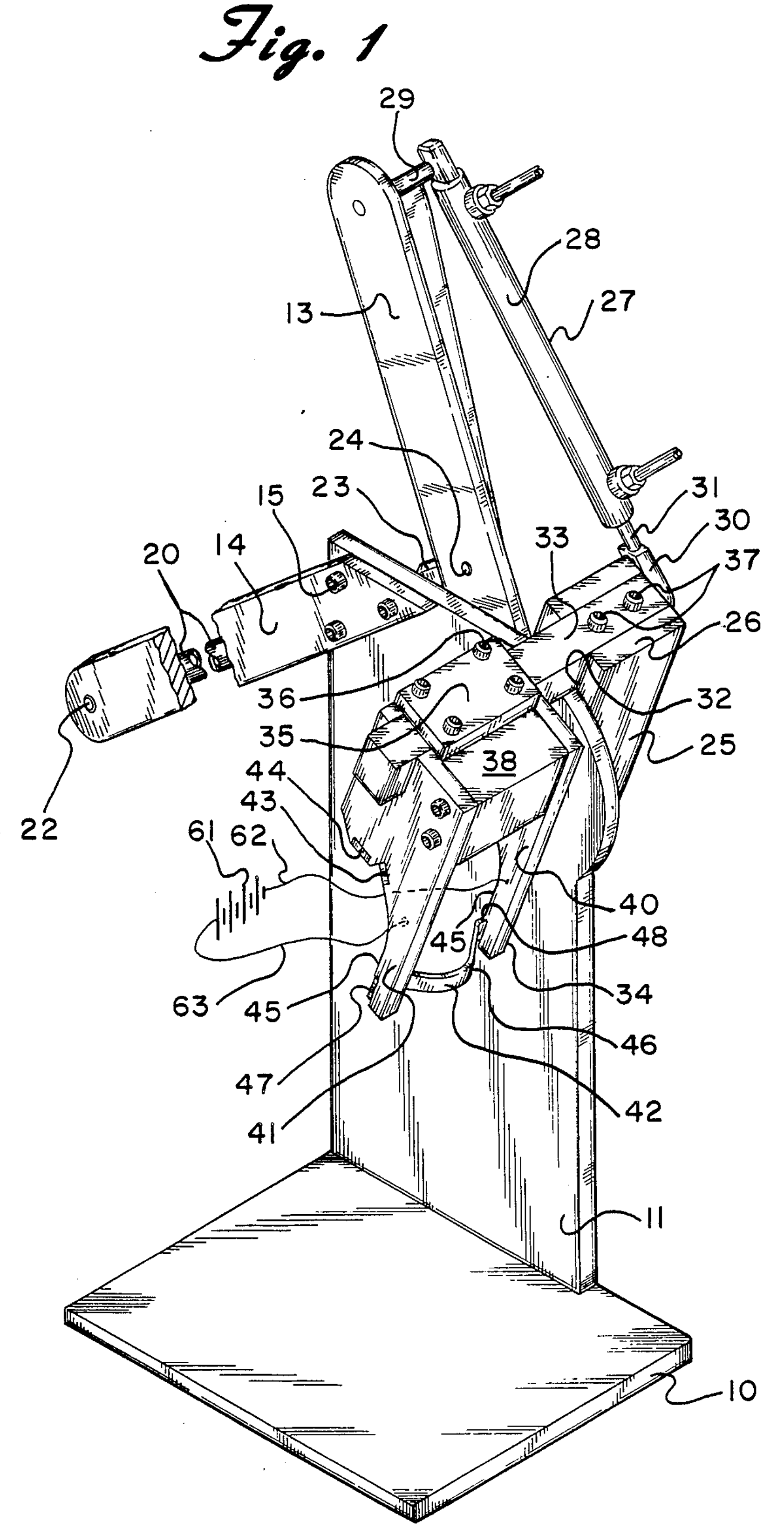
FIG. 1 is a top perspective view of a device constructed in accordance with the teaching of the present invention.
Figure 2:
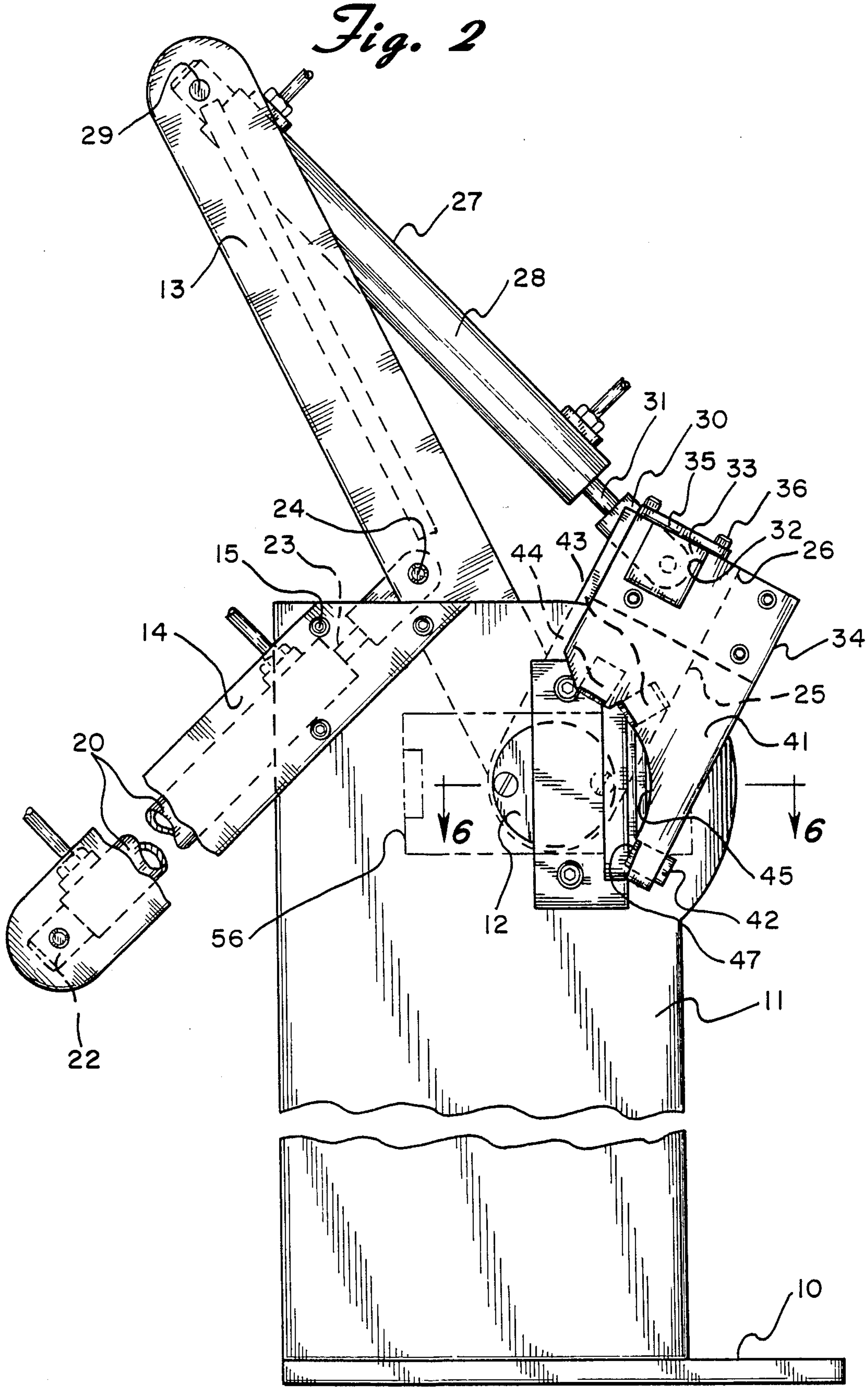
FIG. 2 is a side elevational view of the device in FIG. 1, taken from the left hand side thereof.
Figure 3:
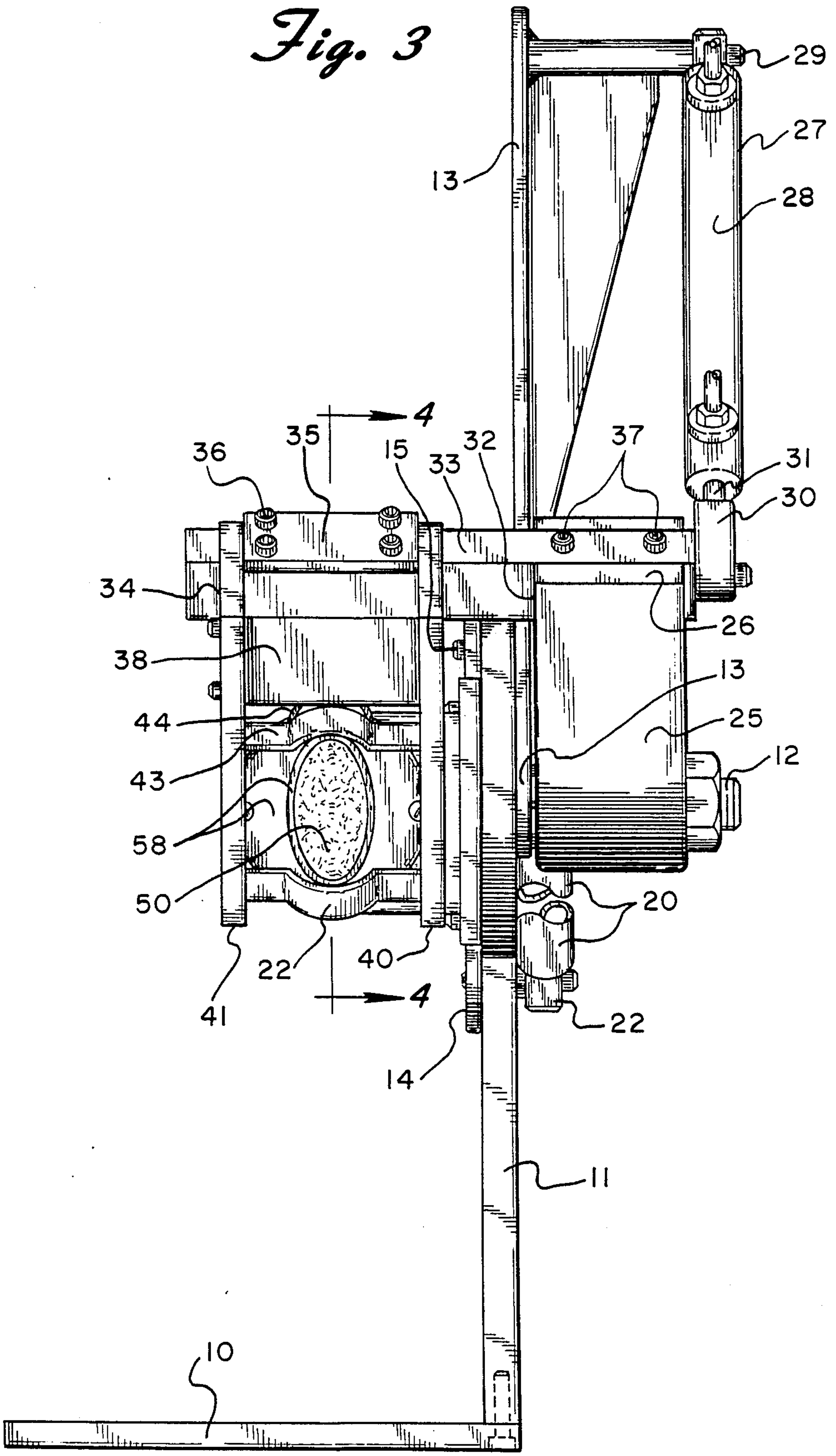
FIG. 3 is an elevational view of the shaping device of FIGS. 1 and 2, taken from the right side in FIG. 2.

Referring now more particularly to the drawings, and specifically to FIGS. 1-3 thereof, a base or support is designated 10, and a side plate or standard 11 upstands from the base 10. A pivot shaft or axle 12 projects laterally from the standard 11 spaced over the base 10.

Rotatably carried by the pivot shaft 12 is a link or arm 13 shown extending obliquely upwardly from the pivot 12. A fixed arm 14 extends from an upper region of the standard 11, obliquely downwardly as seen in FIG. 2, and may be fixed to the standard, as by a pair of fasteners 15. An extensile and retractile operator, as at 20, may extend between the fixed arm 14 and swingable arm 13, being extended and retracted to swing the arm 13 clockwise and counter-clockwise, respectively, as seen in FIG. 1. In practice, the operator 20 may comprise a piston-in-cylinder assembly 21 having one end pinned, as at 22, to the extending end of arm 14, and having the extending end of a piston rod 23 pinned, as at 24, to the swingable arm 13.

In addition, a carrier or block 25 is swingable about the axis of shaft 12, having its distal or outer end portion 26 connected by an extensile and retractile actuator 27 to the arm 13 at a location remote from the shaft 12. The actuator 27 may also comprise a piston-in-cylinder assembly 28 having one end pivotally connected, as at 29 to the outer end of arm 13, and having the extending end 30 of a piston rod 31 pivoted to the end portion 26 of carrier member 25.

Suitable operating means are associated with the actuating devices 20 and 27, such as fluid control means for effecting extension and retraction of the actuating devices in proper direction, sequence and magnitude, for purposes appearing presently.

The carrier member 25 may be formed in its outer end with a non-circular transverse recess or groove 32, extending in general parallel is with the shaft 12. A bar 33 seats conformably in groove 32 and extends therefrom across and beyond the standard 11, where it carries a tool holder assembly 34.

The bar 33 may be removably secured at one end in the recess 32 of carrier 25 by fasteners 37.

The tool holder assembly 34 may include a pair of parallel spaced, similar side members 40 and 41 fixed to opposite ends of a spacer member or insulated block 38, which assembly is recessed to conformably receive bar 33. The side members 40 and 41 are electrically insulated from each other, and the assembly 34 is fixed to the bar 33 by the retaining cap or plate 35 secured by fasteners 36. Thus the tool holder 34 is swingable about shaft 12.

The side plates 40 and 41 of the tool holder 34 may be generally congruent and of an overall triangular configuration with the hypotenuse concavely arcuate having a center of curvature substantially coaxial with the shaft 12.

A plurality of cutters or tools, specifically designated 42, 43 and 44 are carried by the tool holder 34 along the arcuate edges 45 as best seen in FIG. 1. It appears therein that the tool 42 is in a lowermost position along the tool holder edge 45, while the tool 43 is spaced upwardly along the edge 45 from the tool 42, and the tool 44 is at an uppermost position along the edge 45.

The tools 42, 43 and 44 may all be substantially identical, as shown in FIG. 1, each including an elongate cutting strip 45 having a cutter provided along one edge. The major central portion of each strip 46 is arcuately bent for extension between the spaced holder side plates 40 and 41, while the remaining end portions 47 and 48 may be formed for removable securement to respective holder side plates.

As the cutting tools 42, 43 and 44 all move with the holder 34 about the axis of shaft 12, the cutting edges will define an arcuate cut about the shaft 12 as a center of curvature; and as the major, central portions 46 of the cutters are bowed about an axis in a plane normal to shaft 12, it will be appreciated that each of the cutters 42, 43 and 44 defines a toroidal surface when the tool holder 34 is swung about the shaft 12.

The lowermost cutter 42 may be termed the pre-cutter, the next upper cutter 43 may be termed the rough-cutter, and the uppermost cutter 44 may be termed the finish-cutter.

Each of the cutters 42–44 move along an arc about the axis of shaft 12 a center; and further each of the cutters 42–44 is shaped, arranged or located for effective cutting action with the cutting surface extending in the direction opposite to cutting obliquely away from the line of cutting to afford relief to the cutting surface. This will become apparent in the following description.

Figure 4:
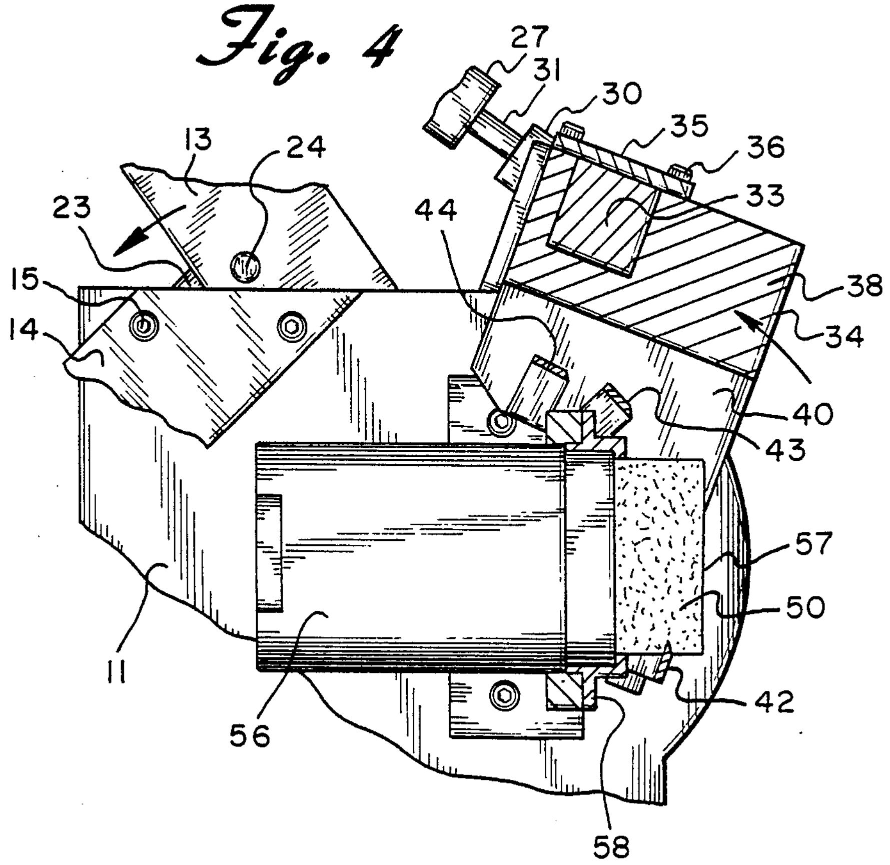
FIG. 4 is a partial sectional view taken along the line 4—4 of FIG. 3, and illustrating an early stage in the instant method.

The workpiece may be a block of solid, soft material, as at 50 in FIG. 4, which was previously poured into and solidified in a case 56. The block 50 is shown in FIG. 4 as having a generally flat or irregular end surface 57 resulting from the pouring operation, and extending from the case 56, as by a conventional block extending mechanism (not shown).

A work holder, such as a collar 58 conformably receives the case 56 to properly locate the case and block 57 for the shaping operation.

FIG. 4 illustrates the pre-cutter 42 having been moved edgewise transversely of and into cutting engagement with the workpiece or block 50. That is, the pre-cutter 42 moves upwardly into cutting engagement with the lower side of the block 50, moving a predetermined, relatively short distance into the work block and retracting therefrom, as seen in FIG. 5, to leave a notch 59.

Figure 5:
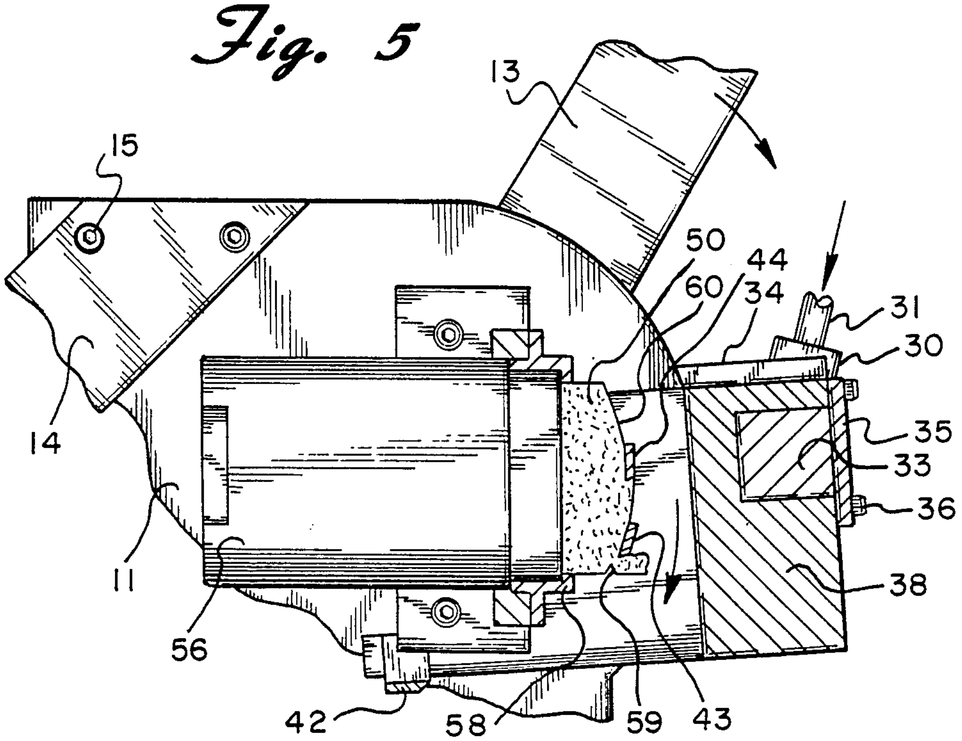
FIG. 5 is a view similar to FIG. 4 illustrating a later stage in the method of the present invention.
Figure 6:
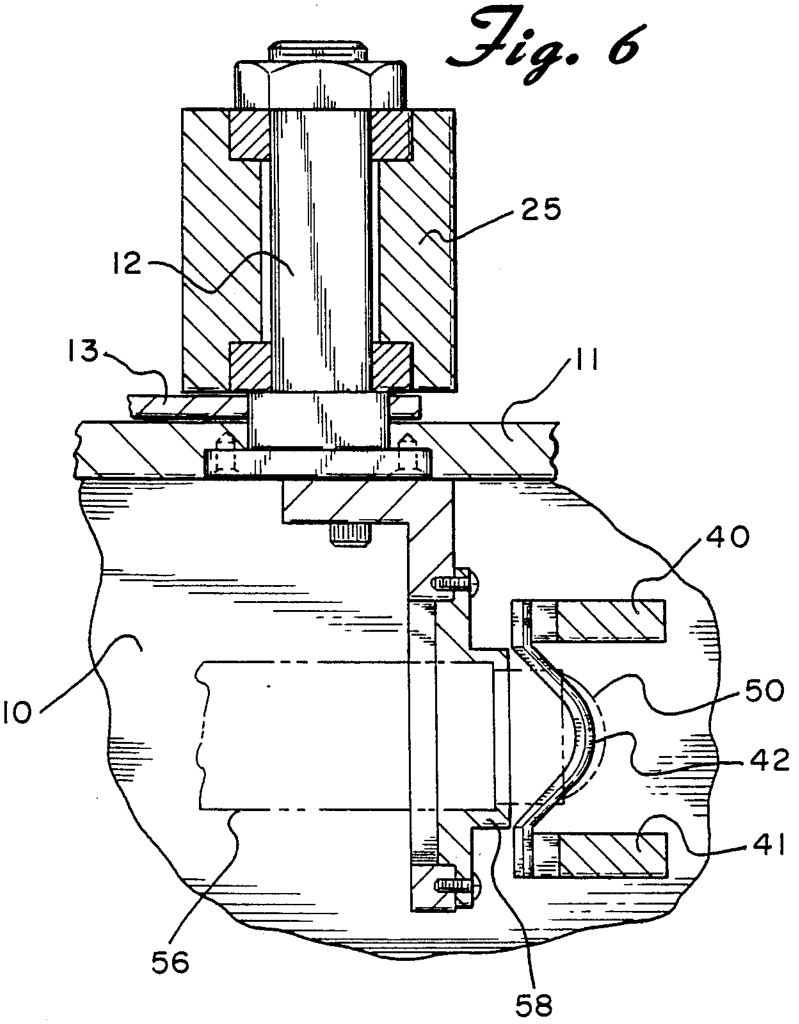
FIG. 6 is a partial sectional view along line 6—6 of FIG. 2.
Figure 7:
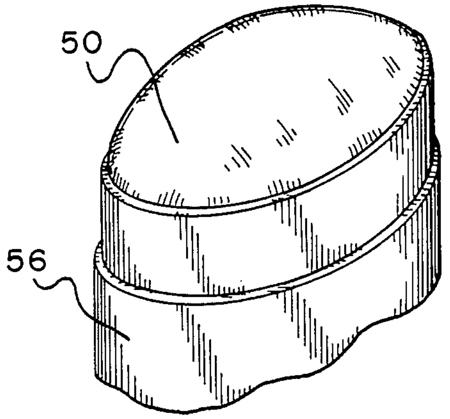
FIG. 7 is a view of a workpiece and workholder in accordance with the present invention.

The rough cutter 43 then moves arcuately downwardly, transversely of the workpiece 50, into cutting engagement with the upper side of the workpiece, see FIG. 5. Upon continued arcuate downward movement of the rough cutter 43, along the arcuate path 60, the rough cutter 43 moves into the inner end of the notch 59. That is, the pre-cutter 42 and rough cutter 43 move along the same arc about the axis shaft 12.

It has been found in practice, that the rough cut along line 60 cannot be completed without the pre-cut or notch 59, as the rough cutter 43 will effect breaking of the block 50 near its lower edge, rather than smooth cutting when a substantial quantity of material must be cut off.

However, after the rough cut along line 60 by cutter 43, the finish cutter 44 may move through its entire arc and remove a relatively small amount of workpiece material without breaking of the workpiece, but rather with the formation of a desirable finish cut.

In practice of the foregoing method, suitable means is provided for the successively feeding work to the work holder 58. By suitable controls the actuator 20 is retracted while the actuator 27 remains unactuated. This effects movement of arm 13 and block 25 counterclockwise, as seen in FIG. 1, to move the pre-cutter 42 into notching engagement, as shown in solid lines in FIG. 4.

The actuator 20 may then be extended to its original position to withdraw the pre-cutter 42 from the block 50.

The actuator 27 may then be extended to swing the carrier 25 clockwise, as seen in FIG. 1, successively moving the rough cutter 43 to the notch 59, and the finish cutter 44 clockwise to take a light finishing cut on the work block.

Thus, the pre-cutter blade 42 is angled downwardly away from the cutting line, and the rough and finished cutters 43 and 43 are angled upwardly from the cutting line to afford relief to the cutters.

In practice, the workpiece 50 is inserted into the work holder 58 with the cutters 42-44 in the position shown in FIG. 1. The workpiece is retracted from the holder 58 immediately after the downward finishing cut so that a cutting blade need not drag on the finished surface. The tool holder 40 is then returned to its position shown in FIG. 1 for insertion of a new work block to be shaped.

While certain materials may be shaped without the use of heat, it has been found advantageous in shaping deodorant bars to heat the cutters 42–44, as by an electrical source 61 connected by conductors 62 and 63 to opposite tool holder side bars 40 and 41.

From the foregoing it is seen that the present invention provides a method and apparatus for shaping soft and solid material wherein the body is notched on one side and a cutter moves inwardly through the other side of the body to enter the closed end of the notch and sever body material without breaking.

Although the present invention has been described in some detail by way of illustration and example for purposes of clarity of understanding, it is understood that certain changes and modifications may be made within the spirit of the invention.

What is claimed is:

1. The method of shaping a solid body of soft material comprising precutting a notch into one side of the body, rough cutting the body along a first line extending inwardly from the other side of and across the body and located to remove substantial material and enter the closed end of the notch, and then finish cutting the body along a second line extending entirely across the body at a location to remove relatively little material.

2. The method according to claim 1, further characterized in precutting, rough cutting and finish cutting by moving blades transversely into cutting engagement with the body.

3. The method according to claim 2, further characterized in swinging a blade carrier from a start position in one direction to precut and in the opposite direction through and beyond said start position to rough and finish cut.

4. The method according to claim 3, further characterized in locating a body in the path of blade movement just prior to precutting, and removing the body immediately after finish cutting.

5. The method according to claim 3, further characterized in locating a body in the path of blade movement just before swinging the blade carrier in said one direction, and removing the body immediately after swinging the carrier in said opposite direction.

6. The method according to claim 5, further characterized in swinging the carrier a short distance from said start position in one direction for precutting partially through the body to define the notch, and swinging the carrier a longer distance in said other direction through and beyond said start position for rough and finish cutting entirely across the body.

7. The method according to claim 6, further characterized in returning said carrier in said one direction to the start position, and then locating a second body in the path of blade movement before again swinging the carrier in said one direction.

8. A device for shaping a solid body of soft material comrpising a holder for holding the body, a notching tool movable relative to said holder toward and away from said body for notching one side of said body, a first cutter movable relative to said holder along a first line extending inwardly from the other side of and entirely across the body at a location entering the closed end of the notch to avoid the breaking off of body material, and a second cutter movable relative to said holder along a second line extending inwardly from the other side of and entirely across the body at a location removing relatively little body material to finish cut the body.

9. A device according to claim 8, said notching tool comprising a cutter movable toward and away from said body for cutting engagement with said one body side.

10. A device according to claim 8, said first and second cutters each comprising an elongate blade having a longitudinal knife edge for movement along the first and second lines, respectively, and extending away from said lines for relief.

11. A device according to claim 8, in combination with mounting means mounting said first and second cutters for simultaneous swinging movement.

12. A device according to claim 11, said mounting means comprises a swingable arm carrying said first and second cutter, said first and second cutters being mounted on said arm forwardly and rearwardly of each other, respectively, in the direction of cutter movement, for sequential cutting by said cutters.

13. A device according to claim 11, said notching tool being carried by said mounting means spaced from said cutters for extension between said notching tool and cutters of a body to be cut.

14. A device according to claim 13, in combination with means heating said tool and blades to facilitate working said body.

15. A device according to claim 13, said notching tool and cutters being arcuate with their centers of curvature lying in a plane, and said mounting means mounting said tool and cutters for swinging movement about an axis normal to said plane, for cutting a toroidal surface on said body.

* * * * *